United States Patent
Abedi

(10) Patent No.: US 8,054,794 B2
(45) Date of Patent: *Nov. 8, 2011

(54) VIRTUALLY CENTRALIZED UPLINK SCHEDULING

(75) Inventor: Saied Abedi, Berkshire (GB)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/646,031

(22) Filed: Dec. 23, 2009

(65) Prior Publication Data

US 2010/0099427 A1    Apr. 22, 2010

Related U.S. Application Data

(62) Division of application No. 10/565,866, filed on Jan. 24, 2006, now Pat. No. 7,660,280.

(30) Foreign Application Priority Data

Oct. 3, 2003 (GB) .................................. 0323246.9
Oct. 1, 2004 (WO) ................ PCT/GB2004/004209

(51) Int. Cl.
*H04W 4/00* (2009.01)
(52) U.S. Cl. ......................... 370/329; 370/328; 370/341
(58) Field of Classification Search .................. 370/230, 370/230.1, 231–235, 236, 252–253, 310, 370/328–329, 331–338, 343–344, 346–350, 370/395.4, 430, 432, 437, 443, 449, 465, 370/468, 477–478, 480, 340–341; 455/88, 455/102, 418, 450, 453, 508–510, 522, 550.1, 455/556.2, 561, 562.1, 575.7, 422.1, 423–425, 455/452.1–452.2, 512–514, 515–517

See application file for complete search history.

(56) References Cited

U.S. PATENT DOCUMENTS

| | | | |
|---|---|---|---|
| 5,914,950 A * | 6/1999 | Tiedemann et al. | .......... 370/348 |
| 5,923,650 A | 7/1999 | Chen et al. | |
| 6,769,086 B2 | 7/2004 | Western et al. | |
| 6,771,987 B1 | 8/2004 | Dam et al. | |

(Continued)

FOREIGN PATENT DOCUMENTS

EP    0 877 512    11/1998

(Continued)

OTHER PUBLICATIONS

International Search Report dated Mar. 8, 2005, from the corresponding International Application.

(Continued)

*Primary Examiner* — Meless Zewdu
(74) *Attorney, Agent, or Firm* — Katten Muchin Rosenman LLP

(57) ABSTRACT

A method of scheduling uplink transmissions from a plurality of source user equipments to a base station is disclosed. The method comprises the steps of determining the amount of data in the data buffer of each of the user equipments, comparing the amount of data in the data buffers of the user equipments to obtain, for each user equipment, a relative indicator, the relative indicator indicating how full that user equipment's data buffer is in comparison to the data buffers of the other user equipments, and scheduling uplink transmissions in dependence on the relative indicators. In this way, each user equipment is given some knowledge of the state of the buffer in the other user equipments. The user equipments are therefore able to make more efficient scheduling decisions. This can improve the throughput and give lower packet delivery delays.

3 Claims, 5 Drawing Sheets

U.S. PATENT DOCUMENTS

| | | | |
|---|---|---|---|
| 6,847,629 B2 | 1/2005 | Razoumov et al. | |
| 6,865,393 B1 | 3/2005 | Baum et al. | |
| 6,898,194 B1 | 5/2005 | Vedrine | |
| 6,993,342 B2 | 1/2006 | Kuchibhotla et al. | |
| 6,996,415 B2 * | 2/2006 | Lee et al. | 455/522 |
| 7,020,110 B2 | 3/2006 | Walton et al. | |
| 7,047,016 B2 | 5/2006 | Walton et al. | |
| 7,158,504 B2 | 1/2007 | Kadaba et al. | |
| 7,158,804 B2 | 1/2007 | Kumaran et al. | |
| 7,177,293 B2 | 2/2007 | Mansfield | |
| 7,184,713 B2 | 2/2007 | Kadous et al. | |
| 7,283,814 B2 | 10/2007 | Klein et al. | |
| 7,321,780 B2 | 1/2008 | Love et al. | |
| 7,324,821 B2 | 1/2008 | Kwak et al. | |
| 7,356,346 B2 | 4/2008 | Gopalakrishnan et al. | |
| 7,369,508 B2 | 5/2008 | Parantainen et al. | |
| 7,463,616 B1 | 12/2008 | Earnshaw et al. | |
| 7,551,546 B2 * | 6/2009 | Ma et al. | 370/208 |
| 7,660,280 B2 * | 2/2010 | Abedi | 370/329 |
| 7,733,846 B2 | 6/2010 | Liu | |
| 2001/0055972 A1 | 12/2001 | Sakata | |
| 2002/0061007 A1 | 5/2002 | Pankaj | |
| 2002/0061073 A1 * | 5/2002 | Huang et al. | 375/295 |
| 2002/0093953 A1 * | 7/2002 | Naim et al. | 370/386 |
| 2002/0142780 A1 | 10/2002 | Airy et al. | |
| 2002/0155840 A1 | 10/2002 | Yoshii et al. | |
| 2002/0155853 A1 * | 10/2002 | Lee et al. | 455/522 |
| 2003/0210660 A1 | 11/2003 | Wiberg et al. | |
| 2004/0062206 A1 | 4/2004 | Soong et al. | |
| 2004/0109424 A1 | 6/2004 | Chheda | |
| 2004/0162083 A1 * | 8/2004 | Chen et al. | 455/454 |
| 2004/0218567 A1 * | 11/2004 | Budka et al. | 370/332 |
| 2004/0219920 A1 | 11/2004 | Love et al. | |
| 2004/0224677 A1 * | 11/2004 | Kuchibhotla et al. | 455/422.1 |
| 2004/0258026 A1 | 12/2004 | Lau | |

FOREIGN PATENT DOCUMENTS

| | | |
|---|---|---|
| EP | 1 003 302 | 5/2000 |
| EP | 1 130 872 | 9/2001 |
| JP | 2001-320410 | 11/2001 |
| WO | 02/39760 | 5/2002 |

OTHER PUBLICATIONS

United Kingdom Search Report dated Feb. 17, 2004, from the corresponding United Kingdom Application.
International Preliminary Report on Patentability and Written Opinion of the International Searching Authority dated Apr. 13, 2006, from the corresponding International Application.
United States Office Action dated Jun. 5, 2008, from corresponding U.S. Appl. No. 10/565,866.
United States Office Action dated Feb. 2, 2009, from corresponding U.S. Appl. No. 10/565,866.
Japanese Office Action dated Jan. 6, 2009, from the corresponding Japanese Application.
United States Office Action dated Dec. 16, 2010, from corresponding U.S. Appl. No. 12/646,035.
United States Office Action dated Sep. 21, 2010, from corresponding U.S. Appl. No. 12/646,035.
United States Office Action dated Sep. 24, 2010, from corresponding U.S. Appl. No. 12/646,038.
United States Office Action dated Sep. 24, 2010, from corresponding U.S. Appl. No. 12/646,044.
United States Office Action dated Mar. 23, 2011, from corresponding U.S. Appl. No. 12/646,035.
United States Office Action dated Mar. 23, 2011, from corresponding U.S. Appl. No. 12/646,038.
United States Office Action dated Mar. 23, 2011, from corresponding U.S. Appl. No. 12/646,044.
United States Office Action dated Aug. 23, 2011, from corresponding U.S. Appl. No. 12/646,038.
United States Office Action dated Aug. 26, 2011, from corresponding U.S. Appl. No. 12/646,044.

* cited by examiner

VIRTUALLY CENTRALIZED UPLINK SCHEDULING

FIELD OF THE INVENTION

The present invention relates to techniques for scheduling of uplink transmissions in wireless communications systems. The present invention is particularly, but not exclusively, applicable to code division multiple access (CDMA) communications systems such as 3 G communication systems.

BACKGROUND OF THE INVENTION

FIG. 1 shows parts of a wireless communications system, in which a plurality of source user equipments UE1, UE2, UE3 are in communication with a plurality of destination user equipments UE4, UE5, UE6 via a base station BS. Source UEs UE1, UE2, UE3 transmit data packets in an uplink to the base station BS. Base station BS receives the data packets from the source UEs and buffers these data packets for onward transmission in a downlink to the destination UEs. In this example, each wireless channel is allocated a separate channelisation code in order to distinguish that channel from the other channels (CDMA).

In the system of FIG. 1 it is necessary to provide some mechanism for determining when and how each of the source UEs transmits its data in the uplink to the base station. In the simplest case, each source UE transmits whenever it has data to send. This technique may work well when there are low offered loads on the uplink. However, if too many UEs try to transmit data at the same time, the interference levels may become unacceptable, resulting in poor quality of service.

Various techniques are known for scheduling of uplink transmissions. The aim of these scheduling techniques is to manage the way in which the UEs transmit to the base station in order to meet certain criteria, such as interfere levels, fairness or throughput.

In one scheduling technique, known as time scheduling, a single UE is given the full uplink resources for a given period of time. Some mechanism is implemented for determining which UE has the channel resources at any one time. For example, each UE may take it in turns to transmit its data, or else the UE which is given the channel resources may be selected by taking into account the channel quality.

In time scheduling, only one UE transmits at any one time, and so each UE can transmit within its time window at a high data rate, without causing interference to other UEs. However, time scheduling is inefficient in terms of throughput in the uplink due to the delays involved in informing each UE when it can transmit. Other disadvantages of time scheduling include loss of interference diversity (which increases the interference caused to adjacent cells), less accurate power control, due to less frequent power control signals, and wasted uplink capacity when a UE has little to transmit.

In another scheduling technique, known as rate scheduling, each UE decides on the rate at which it transmits data based on information which is signalled to it by the network. For example, in 3 G communications systems (W-CDMA), each UE may decide its rate based on information from the Transport Format Combination Set (TFCS) signalled to it by the radio network controller (RNC). This rate is usually less than the UE's maximum rate, and is set to ensure that interference remains within acceptable levels.

SUMMARY OF THE INVENTION

An advantage of rate scheduling is that, since many UEs are transmitting, interference diversity is maintained, which reduces interference to neighbouring cells. Rate scheduling also provides the advantage that call admission and power control mechanisms are more accurate than for time scheduling. However, rate scheduling suffers from the disadvantage that the UEs will each interfere with each other, since many UEs may be transmitting simultaneously.

In the downlink, it is the base station which is responsible for scheduling the packets which are to be transmitted to the various destination UEs. The scheduling functions for the downlink are therefore centralized in the base station. The base station is able to make the appropriate scheduling decisions because it is solely responsible for transmitting to the destination UEs. For example, the base station is aware of the amount of data in the buffers allocated for each destination UE, and thus can make scheduling decisions based on this knowledge. However, in the uplink the scheduling functions are decentralized, that is, they are distributed amongst the source UEs. The source UEs are not aware of the amount of data in the buffers of the other source UEs. As a consequence, it is not possible for the source UEs to make scheduling decisions based on the amount of data which the other UEs have to transmit.

For example, in a situation where only one UE has a significant amount of data to transmit (i.e. the other UEs have little data, or there are few active UEs actually present), the UE with a large amount of data still cannot choose to transmit at a high data rate, because it is not aware of the status of the other UEs. In this situation, the UE with a large amount of data will experience unnecessary delays, because it could in fact have transmitted at a higher data rate. On the other, hand when the base station is dealing with many UEs at any one time, a UE which is not aware of the situation might choose a very high data rate. This may lead to a high level of interference for the entire uplink, and thus a reduction in the quality of service for all UEs.

In order to prevent the necessary delays that might occur when there are UEs present with only small amounts of data to transmit, it has been proposed, in the context of 3 G mobile communications system, to set a buffer threshold for each UE. This threshold is defined as minimum buffer requirement before access to channel can be granted. Thus, a given UE will not transmit until the number of packets in its buffer reaches the threshold. This proposal aims to avoid under utilization of radio resources in uplink rate scheduling. However, it has been realised pursuant to the present invention that such a threshold may not on its own be enough to achieve good utilization of channel resources. For example, in a situation in which one UE is just below the assigned threshold and the other UEs are also all below this threshold, the first UE will not still not transmit for a while and will experience an unnecessary delay. Avoiding such delays is highly desirable for UEs with real-time continuous streaming services such as voice or video.

According to a first aspect of the present invention there is provided a method of scheduling uplink transmissions from a plurality of source user equipments to a base station, the method comprising the steps of:
    determining the amount of data in the data buffer of each of the user equipments;
    comparing the amount of data in the data buffers of the user equipments to obtain, for each user equipment, a relative indicator, the relative indicator indicating how full that user equipment's data buffer is in comparison to the data buffers of the other user equipments; and
    scheduling uplink transmissions in dependence on the relative indicators.

The present invention provides the advantage that uplink scheduling decisions can be made using knowledge of the relative amounts of data in the buffers of the user equipments. This may allow better use to be made of the available resources, which may result in better throughput, lower packet delays, and better quality of service.

For each user equipment, either a single relative indicator or a plurality of relative indicators may be determined. By using a plurality of relative indicators, each user equipment may have a better idea of its overall status in comparison to other user equipments. Where a single relative indicator is determined for each user equipment, this may be one of an indication of how full the user equipment's buffer is in comparison to the average, and an indication of how full the user equipment's buffer is in comparison to the minimum. Otherwise, both an indication of how full the user equipment's buffer is in comparison to the average, and an indication of how full a user equipment's buffer is in comparison to the minimum may be determined.

The base station is in communication with all of the user equipments, and therefore may be in the best position to compare the amount of data in the data buffers of the user equipments. Therefore the comparing step may be carried out by the base station, although it could be carried out elsewhere, such at an radio network controller (RNC), or at user equipments themselves, if appropriate.

The method may comprise the step of transmitting the or each relative indicator for each user equipment from the base station to that user equipment. In this way, each user equipment is given some knowledge of the state of the buffer in the other user equipments, which it can use to make scheduling decisions. Alternatively, the base station may determine, based on the or each relative indicator, a transmission format to be used by a user equipment in scheduling uplink transmissions from the user equipment to the base station. The base station may then transmit to the user equipment an indication of the transmission format to be used by the user equipment. For example, the base station may transmit a rate and/or time (e.g. waiting time) of packet transmission to the user equipment.

In order for the base station to compare the amount of data in the data buffers of the user equipments, it must have available the actual amount of data in each data buffer. In order to achieve this, in one embodiment, a user equipment determines an amount of data in its data buffer and transmits an indication of the amount of data to the base station. If all of the user equipments transmit the amount of data in their data buffers in this way, the base station is then in a position to determine the relative indicators.

In order for the uplink scheduling to be effective, the relative indicators are preferably updated on a regular basis. However, it may in some circumstances be undesirable for the user equipments to be transmitting indications of the amount of data in their data buffers on a regular basis. For example, if many user equipments are present, or a large amount of data needs to be transmitted in the uplink, the extra transmissions involved in the reporting process may increase the amount of interference or congestion to an unacceptable level. Thus, in a second embodiment, a user equipment sends to the base station an indication of the total amount of data to be sent, and the base station determines the amount of data in the user equipment's data buffer based on the indication of the total amount of data, and the amount of data already received by the base station from that user equipment. This can reduce the number of transmissions involved in the reporting process in the uplink.

Each user equipment may determine a rate and/or time at which it transmits data to the base station based on the or each relative indicator for that user equipment. For example, a user equipment which receives an relative indicator indicating that it has a relatively full buffer may transmit data to the base station at a higher rate than would otherwise be the case (all other things being equal). On the other hand, a user equipment which receives a relative indicator indicating that it has a relatively empty buffer may transmit data to the base station at a lower rate than would otherwise be the case. In this way, the amount of data in the data buffers of the user equipments can brought into approximate equilibrium, so that all of the data buffers have approximately the same occupancy. This increases the fairness of the system, and may also improve the overall throughput.

The user equipment may determine the time and/or rate at which it transmits data based additionally on a measurement of radio channel conditions, such a signal to noise and interference ratio (SNIR). This can allow the user equipment to take advantage of good radio conditions, where they exist, by transmitting at a higher rate than would otherwise be the case. On the other hand, a user equipment with poor radio conditions may decide not to increase its transmission rate when it might otherwise have done so, since it would see little benefit from doing so. The user equipment may determine the measure of radio channel conditions itself, or it may receive it from the base station or the network or elsewhere.

The user equipment may determine the time and/or rate of packet transmission based additionally on the actual amount of data in its data buffer, rather than just the relative indicators. This can allow the scheduling to be based partially on the absolute amount of data in its buffer, which may lead to better decisions. For example, the amount of data in the buffer may be compared to a threshold, such as a minimum buffer threshold.

The user equipment may determine the time and/or rate of packet transmission based additionally on the type of service. In general, user equipments transmitting services with a higher priority or which are more time critical may be allowed to more often or at a greater rate than services with a lower priority or which are less time critical. For example, video services may be given greater priority than web pages.

Each user equipment may be assigned a minimum buffer threshold. In general, if the amount of data in the data buffer is below the threshold, then the user equipment will not transmit. However, this condition may be overridden where the user equipment receives a relative indicator indicating that it has more data to transmit than other user equipments. Therefore a user equipment which receives a relative indicator indicating that it has more data to transmit than other user equipments may transmit data to the base station even if the amount of data in its data buffer is below a minimum buffer threshold.

The uplink transmissions may be scheduled using rate scheduling, or they may be scheduled using hybrid rate-time scheduling. Hybrid rate-time scheduling may be preferred in some circumstances because of the greater flexibility which it offers. For example, it can allow a poorly performing user equipment to recover quickly by allowing it to transmit on its own or with few other user equipments for a certain period of time. However, in other circumstances hybrid rate-time scheduling may not be appropriate; for example the delays which may result in some channels may not be tolerated by the power control mechanism. Therefore the method may also include a step of switching from one to the other of rate scheduling and hybrid rate-time scheduling. The decision to switch from one to the other may be based on some measure of a system parameter, such as a measure of whether power control is being performed within acceptable parameters, or whether interference diversity is within acceptable levels.

In one example, the rate of uplink transmission is varied by adjusting the modulation and coding scheme level. In other example the rate of uplink transmission is varied by adjusting the intervals at which the uplink transmissions take place. A user equipment may also increase its rate of uplink transmissions by adapting its spreading code, or by occupying two or more channels. Any other appropriate technique for varying the rate of uplink transmission could be used as well or instead of these techniques.

According to a second aspect of the invention there is provided a base station for receiving data transmissions from a plurality of user equipments, the base station comprising:

means for determining the amount of data in a data buffer of each of the user equipments;

means for comparing the amount of data in the data buffers of the user equipments to obtain, for each user equipment, a relative indicator, the relative indicator indicating how full that user equipment's data buffer is in comparison to the data buffers of the other user equipments; and means for transmitting the relative indicator for each user equipment from the base station to that user equipment.

The determining means may be arranged to determine, for each user equipment, an indication of how full that user equipment's buffer is in comparison to the average. Alternatively or in addition, the determining means may be arranged to determine, for each user equipment, an indication of how full that user equipment's buffer is in comparison to the minimum. The base station may comprise means for receiving from a user equipment an indication of the amount of data that that user equipment has in its data buffer. The base station may further comprise means for receiving from a user equipment an indication of a total amount of data to be sent by that user equipment, and means for determining the amount of data in the user equipment's data buffer based on the indication of the total amount of data, and the amount of data already received by the base station from that user equipment.

According to a third aspect of the present invention there is provided a user equipment comprising:

a data buffer;

means for determining the amount of data in the data buffer;

means for transmitting an indication of the amount of data in the data buffer to a base station;

means for receiving from the base station a relative indicator, the relative indicator indicating how full the data buffer is in comparison to the data buffers of other user equipments; and means for scheduling uplink transmissions to the base station in dependence on the relative indicator.

According to a fourth aspect of the present invention there is provided a user equipment comprising:

a data buffer;

means for determining an amount of data to be transmitted in a call;

means for transmitting, to a base station, an indication of the amount of data to be transmitted in the call;

means for transmitting data from the data buffer to the base station;

means for receiving from the base station a relative indicator, the relative indicator indicating how full the data buffer is in comparison to the data buffers of other user equipments; and means for scheduling uplink transmissions to the base station in dependence on the relative indicator.

In either the third or fourth aspect, the scheduling means may determine a rate and/or time at which data is to be transmitted to the base station based on the relative indicator. The scheduling means may be arranged such that data is transmitted to the base station at a higher rate than would otherwise be the case when the user equipment receives a relative indicator indicating that it has a relatively full buffer. The scheduling means may also or alternatively be arranged such that data is transmitted to the base station at a lower rate than would otherwise be the case when the user equipment receives a relative indicator indicating that it has a relatively empty buffer. The scheduling means may be arranged to determine the time and/or rate at which data is transmitted based additionally on a measurement of radio channel conditions. The scheduling means may be arranged to determine the time and/or rate of data transmission based additionally on the type of service. The scheduling means may be arranged to determine the time and/or rate of data transmission based additionally on the or a amount of data which is determined to be in its data buffer.

The data buffer in the user equipment may be assigned a minimum buffer threshold. In general, if the amount of data in the data buffer is below the threshold, then the user equipment will not transmit. However, this condition may be overridden where the user equipment receives a relative indicator indicating that it has a relatively large amount of data to transmit. The scheduling means may be arranged such that data is transmitted even when the amount of data in the data buffer is below a minimum buffer threshold, when the user equipment receives a relative indicator indicating that it has more data to transmit than other user equipments.

In another aspect of the invention there is provided a base station which receives data transmissions from a plurality of user equipments, the base station comprising:

a calculation unit which compares the amount of data in the data buffers of the user equipments to obtain, for each user equipment, a relative indicator, the relative indicator indicating how full that user equipment's data buffer is in comparison to the data buffers of the other user equipments; and a transmitter which transmits the relative indicator for each user equipment from the base station to that user equipment.

The base station may comprise a receiver which receives from a user equipment an indication of the amount of data that that user equipment has in its data buffer. Otherwise or in addition the base station may comprise a receiver for receiving from a user equipment an indication of a total amount of data to be sent by that user equipment, and the calculating unit may determine the amount of data in the user equipment's data buffer based on the indication of the total amount of data, and the amount of data already received by the base station from that user equipment.

In another aspect of the invention there is provided a user equipment comprising:

a data buffer;

a unit which determines the amount of data in the data buffer;

a transmitter which transmits an indication of the amount of data in the data buffer to a base station;

a receiver which receives from the base station a relative indicator, the relative indicator indicating how full the data buffer is in comparison to the data buffers of other user equipments; and a scheduler which schedules uplink transmissions to the base station in dependence on the relative indicator.

In a further aspect of the invention there is provided a user equipment comprising:
- a data buffer;
- a unit which determines an amount of data to be transmitted in a call;
- a transmitter which transmits, to a base station, an indication of the amount of data to be transmitted in the call, and which transmits data from the data buffer to the base station;
- a receiver which receives from the base station a relative indicator, the relative indicator indicating how full the data buffer is in comparison to the data buffers of other user equipments; and
- a scheduler which schedules uplink transmissions to the base station in dependence on the relative indicator.

Features of one aspect of the invention may be applied to any other aspect. Any of the method features may be applied to any of the apparatus aspects and vice versa.

In any of the above aspects, the various features may be implemented in hardware, or as software modules running on one or more processors.

The invention also provides computer programs and computer program products for carrying out any of the methods described herein, and computer readable media having stored thereon programs for carrying out any of the methods described herein. A computer program embodying the invention may be stored on a computer-readable medium, or it could, for example, be in the form of a signal such as a downloadable data signal provided from an Internet web site, or it could be in any other form.

Preferred features of the present invention will now be described, purely by way of example, with reference to the accompanying drawings, in which:—

DETAILED DESCRIPTION OF THE PREFERRED EMBODIMENTS

First Embodiment

Figure 1:
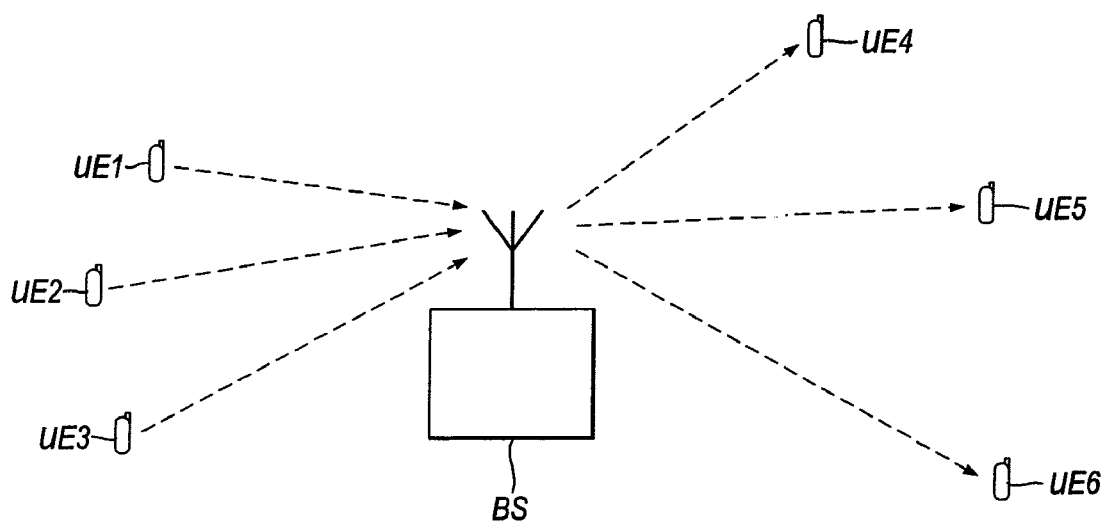
FIG. 1 shows parts of a wireless communications system.

In the first embodiment of the invention an algorithm is implemented which enables the uplink scheduler to become in effect virtually centralised and non-distributed. This enables the UEs to make better decisions on bit rate or waiting time or format of uplink transmission by having available information about the status of other source UEs in the same cell in the uplink. In this embodiment it is assumed that, as shown in FIG. 1, the base station serves a number of source UEs and destination UEs, and each UE is assigned a packet data buffer.

Each of the source UEs is grouped into a particular service group depending on the delay tolerance of the data that it is transmitting. The delay tolerance is a measure of the maximum acceptable time for a data packet to reach its destination. For example, video services may have a low delay tolerance of, say, 100 mS, while web services may have a relatively high delay tolerance.

During each uplink scheduling event, each source UE determines the amount of packet data existing in its buffer and waiting for transmission. Assuming the n-th source UE belongs to the j-th service group with the same delay tolerance, each source UE divides this value by the maximum length of its data buffer to obtain a ratio of buffer occupancy, as follows $$\text{Buffer\_Norm\_L}_n(m) = L_n / L_{max,j}, n=1 \ldots N_j \quad (1)$$

where $L_n(m)$ is the amount of data in the buffer, the index m represents the current TTI or uplink scheduling event, N is the total number of source UEs, and $L_{max,\,j}$ is the maximum packet data buffer length which depends on the service group j. Each UE multiplies this value Buffer_Norm_$L_n$(m) by 100 and takes the integer part to obtain a value referred to herein as the buffer occupancy value. Each UE then sends this value to the base station. As an alternative the real numeric value between zero and one could be sent.

The base station receives the buffer occupancy value from each UE served in the uplink. The base station is also aware of the maximum data buffer assigned to each service, and thus the base station can determine the amount of packet data is currently waiting in each source UE's buffer for transmission. The base station groups the source UEs according to their service class. It then determines the distance of the ratio sent by each source UE from the minimum ratio in each class, as follows $$\text{Distance\_min}_n(m) = \text{Buffer\_Norm\_L}_n(m) - \text{Buffer\_Norm\_L}_{min,j}(m), n=1 \ldots N_j \quad (2)$$

where Nj represents the number of present UEs in class j.

To increase the homogeneous behaviour of the metric, if desired, the distance from minimum value may be subject to a secondary normalised and mathematical mapping, by dividing the distance by the sum of all the distances.

Then the base station determines the distance of the ratio sent by each UE from the average ratio in a class of UEs. To do that the base station first determines the average received ratio as follows $$\text{Avg\_Ratio}_j(m) = \frac{1}{N_j} \sum_{i=1}^{N_j} \text{Buffer\_Norm\_L}_i(m) \quad (3)$$

If desired, this metric may also be subject to a secondary normalised and mathematical mapping, by dividing the average received ratio by the sum of all of the received ratios.

The distance from average is expressed as $$\text{Distance\_Avg}_n(m) = \text{Buffer\_Norm\_L}_n(m) - \text{Avg\_Ratio}_j(m), n=1 \ldots N_j \quad (4)$$

The base station converts the distance from minimum value and the distance from average value to two information bytes and sends them back to the source UEs in the current uplink scheduling event.

Each source UE thus receives two values from the base station, one indicating how full its buffer is in comparison to the least full buffer (distance from minimum), and one indication how full its buffer is in comparison to the average (distance from average). The UE combines these two relative values with its knowledge about the exact amount of packet data in its buffer and with its own knowledge on radio channel condition in terms of SINR (signal to noise and interference ratio) to produce a final metric, as follows.

$$\text{Final\_Metric}_k(m) = \text{COMBI}(\text{Distance\_Avg}_k(m), \text{Distance\_min}_k(m), \text{Ch}_k(m)) \quad (5)$$

where $\text{Ch}_k(m)$ is the knowledge about the quality of the channel in the uplink between the kth source UE and the base station, and COMBI is a function that combines this metric with the distance from average and the distance from minimum.

The UE uses its final metric to determine the rate and/or times at which it transmits its data packets. In general, UEs with a high final metric, indicating a higher buffer occupancy in comparison to other UEs, transmit at a higher rate. In this way the various UEs can be brought into a situation where they have similar levels of buffer occupancy. Further details of the scheduling mechanism are given later.

User Equipment

Figure 2:
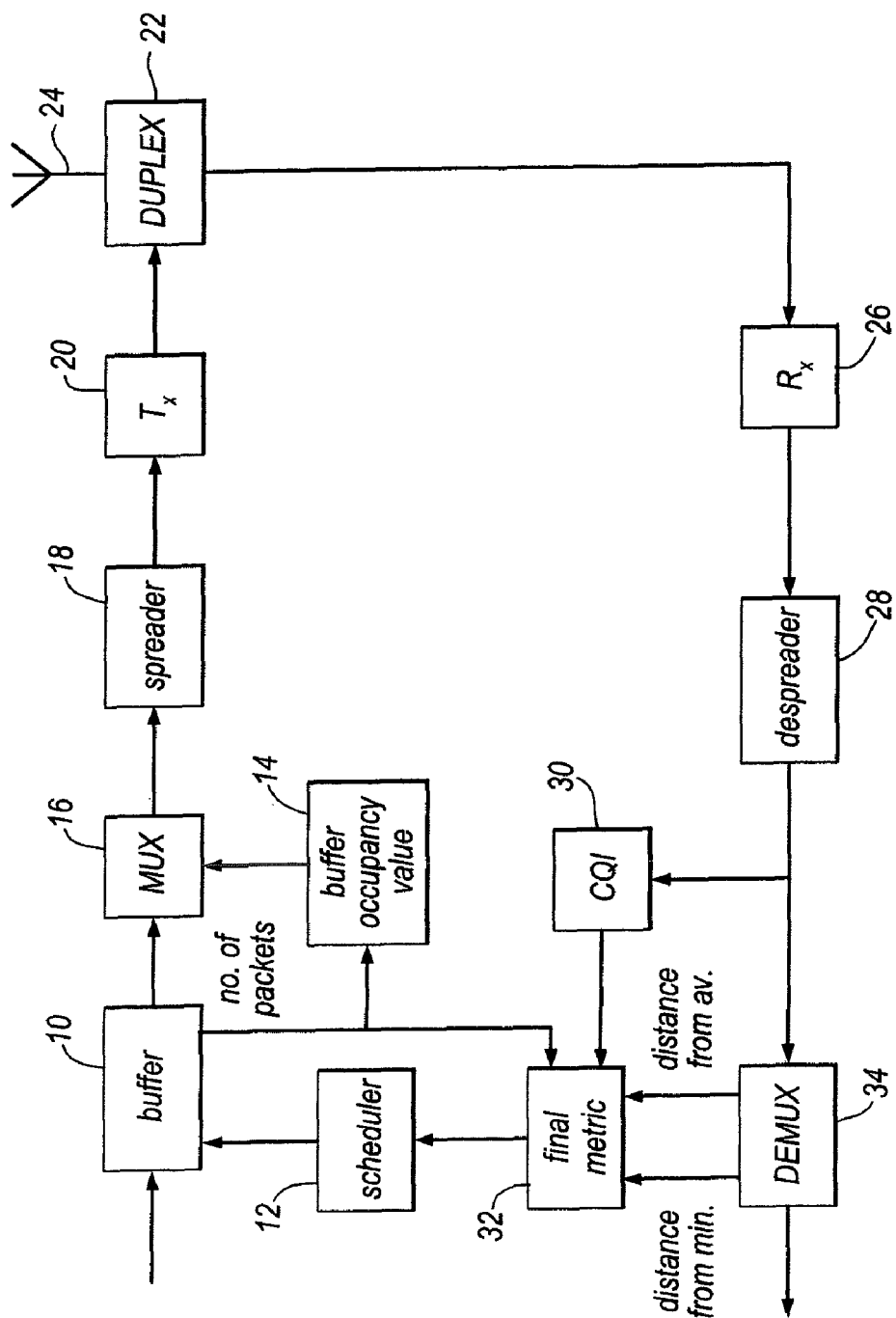
FIG. 2 shows parts of a user equipment in a first embodiment of the invention.

FIG. 2 shows parts of a user equipment in an embodiment of the invention. Referring to FIG. 2, buffer 10 receives data packets which are to be transmitted and stores them on a first-in-first-out basis. Packets for transmission are output from the buffer 10 under control of scheduler 12.

A signal indicating the number of packets currently stored is output from the buffer 10 to buffer occupancy value calculation unit 14. This unit divides the number of stored packets by the maximum length of the buffer to yield the ratio of stored packets to maximum buffer length, in accordance with equation (1) above. The unit 14 then multiplies this value by 100 and takes the integer part to give a value between 1 and 100, referred to herein as the buffer occupancy value.

The buffer occupancy value calculated by unit 14 is output to multiplexer 16. The multiplexer 16 inserts the value into a control channel which is to be transmitted in the uplink to the base station. Packets output from the buffer 10 are inserted into a data channel. The combined signal is then given a channelisation code by spreader 18, and transmitted to the base station by means of transmitter 20, duplexer 22 and antenna 24. Where the user equipment has two or more active base stations, an appropriate channelisation code is used for each base station.

Signals from the base station are received by receiver 26 via antenna 24 and duplexer 22. Signals intended for that particular user equipment are separated from other signals by despreader 28. The output of despreader 28 is a control channel containing control information for, amongst other things, power control. In this embodiment the control channel also contains the distance from average and distance from minimum values transmitted by the base station.

Channel quality indicator 30 estimates the quality of the channel between the user equipment and the base station. Any suitable measure of quality can be produced; for example, a received signal strength (RSS) or power measure, a bit error rate (BER) or a frame error rate (FER) measure, or a signal-to-interference ratio (SIR) or a signal-to-interference-and-noise ratio (SINR) measure could be produced. The measure could be based on a pilot signal broadcast by the base station. For example, the strength of the pilot signal could be taken as a measure of signal quality, or the base station may also broadcast the transmit power ratio of a data channel to the pilot channel, and this ratio could be used in conjunction with the pilot signal strength to obtain a measure of signal quality. Alternatively the measure could be derived from transmission power control (TCP) information (such as a power up/power down instruction) generated in the user equipment for downlink power control purposes. Any of the measures could be based on a history or average of measurements taken over several measurement periods. Two or more measures could be combined, if desired. The output of channel quality indicator 30 is fed to final metric calculation unit 32.

Demultiplexer 34 separates the distance from average and distance from minimum values from the control channel, and passes these values to final metric calculation unit 32. Final metric calculation unit 32 combines the distance from average value, the distance from minimum value, the channel quality value and the number of stored packets value (output from buffer 10) to yield a final metric, in accordance with equation (5) above. The final metric is output to scheduler 12 for use in scheduling uplink data packet transmissions.

The above reporting processes are repeated at appropriate intervals. For example, the buffer occupancy value may be calculated in the UE and transmitted to the base station every Time Transmission Interval (TTI). Similarly the distance from average values and the distance from minimum values may be calculated in the base station and transmitted to the source UEs every TTI. Any of these processes may also be carried out every two or more TTIs where appropriate. For example, when the uplink channel resources are fully utilised, or nearly fully utilised, it may be desirable to reduce the amount of data which is transmitted for the purposes of scheduling. In this case the reporting processes may only take place every few TTIs. The intervals at which the reporting processes take place may be varied, for example, depending on traffic conditions in the cell or sector.

Base Station

Figure 3:
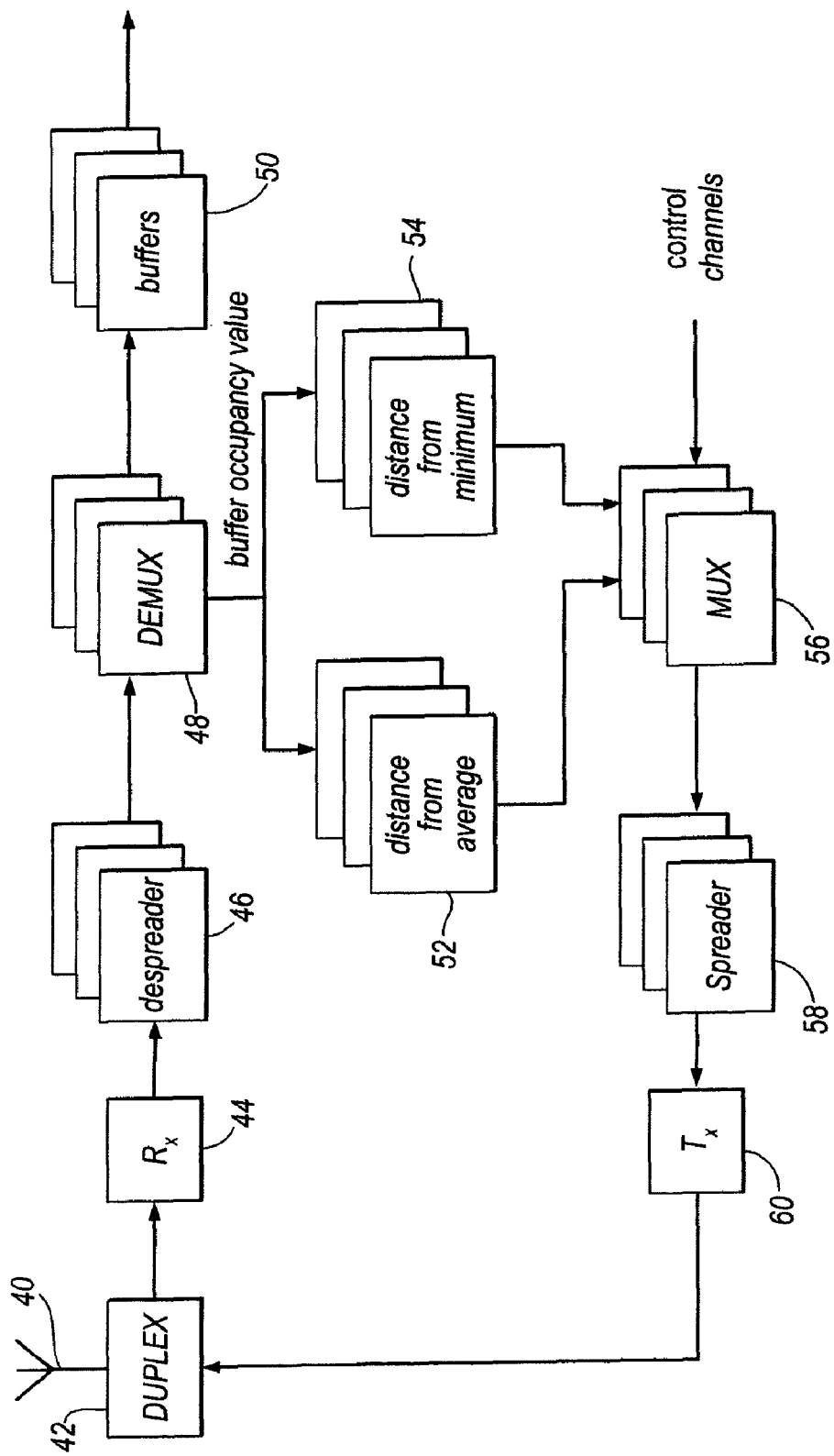
FIG. 3 shows parts of a base station in a first embodiment of the invention.

FIG. 3 shows parts of a base station in an embodiment of the invention. Referring to FIG. 3, the signals from source user equipments are received by receiver 44 via antenna 40 and duplexer 42. The received signals are passed to a plurality of despreaders 46. Each of the despreaders uses the channelisation code employed in one of the uplink channels from the source UEs to the base station in order to separate the data packets transmitted by that source UE. In this way, the data packets from the various source UEs are separated into separate signals.

The outputs of each one of the despreaders 46 is input to one of a plurality of demultiplexers 48. Each of the demultiplexers separates out the buffer occupancy value from the control channel which is transmitted by the corresponding UE. The data packets for onward transmission to the destination UEs are output to buffers 50, one buffer being provided for each destination UE.

The buffer occupancy values output from the demultiplexers 48 are fed to distance from average calculation units 52 and distance from minimum calculation units 54. Each of the distance from average calculation units 52 calculates the distance of the buffer occupancy value of one of the source UEs from the average buffer occupancy value in that class, in accordance with equations (3) and (4) above. Each of the distance from minimum calculation units 54 calculates the distance of the buffer occupancy value of one of the source UEs from the minimum buffer occupancy value in that class, in accordance with equation (2) above. The outputs of distance from average calculation units 52 and distance from minimum calculation units 54 are therefore the distance from average values and the distance from minimum values respectively for each source UE.

The distance from average values and the distance from minimum values are fed to multiplexers 56. Each of the multiplexers 56 multiplexes the distance from average value and the distance from minimum value for one of the source UEs into a control channel that is to be transmitted to that UE. The various control channels are then given channelisation codes by spreaders 58 and transmitted to the source UEs by means of transmitter 60, duplexer 42 and antenna 40.

Scheduling Algorithm

In the present embodiment two different uplink scheduling mechanisms are used, depending on the overall status of the communications system. The first mechanism is a hybrid rate-time scheduling mechanism. In this mechanism, unlike pure time scheduling, one UE does not occupy all of the uplink resources at any one time. On the other hand, unlike pure rate scheduling, not all of the UEs are transmitting all of the time. Instead, each UE is able to vary the rate and the intervals at which it transmits.

In the hybrid rate-time scheduler, each UE has an active mode within which it is allowed by the uplink scheduling functionality to transmit. The UE can also adjust the rate at which it transmits when in the active mode. This transmission period may be, for example, one TTI, or one downlink scheduling event. Each UE also has a silent mode in which it does not transmit. The UE may experience alternate active periods and silent periods. In this way the UE effectively combines rate scheduling and time scheduling.

In some circumstances the delay which results from time scheduling in the hybrid rate-time scheduler can not be tolerated by the power control mechanism. Therefore the second scheduling mechanism which may be used is a rate scheduling mechanism which avoids the silent transmission periods which are experienced in the hybrid rate-time scheduler. In the second scheduling mechanism the silent time is zero, and therefore all of the source UEs transmit at the same time, in a similar way to WCDMA rate scheduling. However, each UE may vary its rate of transmission.

In both rate scheduling and hybrid rate-time scheduling, the rate of transmission may be varied by adjusting the Modulation and Coding Scheme (MCS) level. The MCS level is decided by the UE based on the final metric which it has calculated. This may be done, for example, by consulting a look-up table which includes the appropriate MCS levels for each value of the final metric.

In the hybrid rate-time scheduler, in order to decide when to transmit, each UE makes use of an assigned maximum acceptable waiting time or sleeping time. This is a value which is assigned to the UE depending on the type of service, and gives the maximum time which is acceptable for a data packet to wait at the UE before being transmitted. Each UE then determines an actual waiting time for its data packets based on the maximum waiting time and the final metric. By adjusting the actual waiting time of the data packets, the UE in effect adjusts its data transmission rate.

When a UE receives a high distance from minimum value and a high distance from average value, it knows that it has a relatively large amount of data to transmit. The UE is also aware of the actual amount of data which it has in its buffer waiting to be transmitted. If the actual amount of data which the UE has to deliver is also high, then the UE will switch to a high data rate for a certain amount of time, such as a few TTIs or uplink scheduling events. Where the actual amount of data to transmit is not so great the data rate may be set accordingly, to avoid transmitting at high powers for short amounts of time.

Similarly, when a UE receives a low distance from minimum value and a low distance from average value, it knows that the amount of data in its buffer is well below average. In this case the UE will reduce its transmission rate. The result is a balancing of the UE buffer lengths: UEs with a large amount of data waiting to transmit will have the chance to catch up with other UEs and to reduce their buffer occupancy to lower levels which are closer to average. In this way controllable fairness is introduced into the uplink packet scheduling.

The radio conditions in the uplink can also be used to influence the decision making process. For example, if radio conditions are good and a UE has a large amount of data to transmit, then that UE may transmit at a higher rate than if the radio conditions were not so good. If the radio conditions are poor, then, even if the UE has a large amount of data to transmit, it may have to accept a lower transmission rate to avoid degrading the uplink channel for relatively little gain. If the radio channel conditions are superb, a UE having a fairly low buffer occupancy might still increase its transmission rate somewhat. In this way the need for fairness is balanced with the need for high overall throughput.

The distance from minimum and distance from average values can also be used to override an assigned minimum buffer threshold. In general, if the amount of data a UE's data buffer is below the threshold, then the UE will not transmit. However, this condition may be overridden where a UE determines that it has more data to transmit than the other UEs. Thus, if the UE's buffer is below the threshold, but the other UEs also have little data to transmit, the first UE can still transmit and thus avoid unnecessary delay and under-utilisation of radio resources.

Second Embodiment

In the first embodiment of the invention a buffer occupancy value is sent from each source user equipment to the base station every scheduling event, which may be every TTI, or every few TTIs. However, in some circumstances even reporting every few TTI may be undesirable because of the channel resources which are occupied. Thus, in a second embodiment of the invention, rather than transmit the buffer occupancy values to the base station at every scheduling event, the base station estimates the buffer occupancy values based on information transmitted to it at the beginning of a call, together with its own knowledge of how many packets it has received from a particular UE.

In this embodiment it is assumed that each UE is capable of determining the amount of packet data to be sent at the beginning of packet call. Each UE then sends this value to the base station. As communication proceeds further, the base station estimates the amount of data remaining in each UE buffer based on these received values, and the number of packets that have been received from each UE. The estimated values thus obtained are then used to determine distance from average values and distance from minimum values, as in the first embodiment.

In the second embodiment the distance from average and distance from minimum values are transmitted to the UEs for use in uplink scheduling in the same way as in the first embodiment. Thus this reporting process still requires transmission to be made from the base station to the user equipments on a regular basis. However, since the present embodiments are concerned with uplink scheduling, i.e. situations in which data is being sent from the user equipments to the base station, the extra transmissions in the downlink for the reporting process are unlikely to be problematic.

A user equipment in the second embodiment is similar to that shown in FIG. 2 except that, instead of buffer occupancy calculation unit 14, a total number of packets indicator is provided which inserts into the control channel at the start of a packet call the total number of packets in that call.

Figure 4:
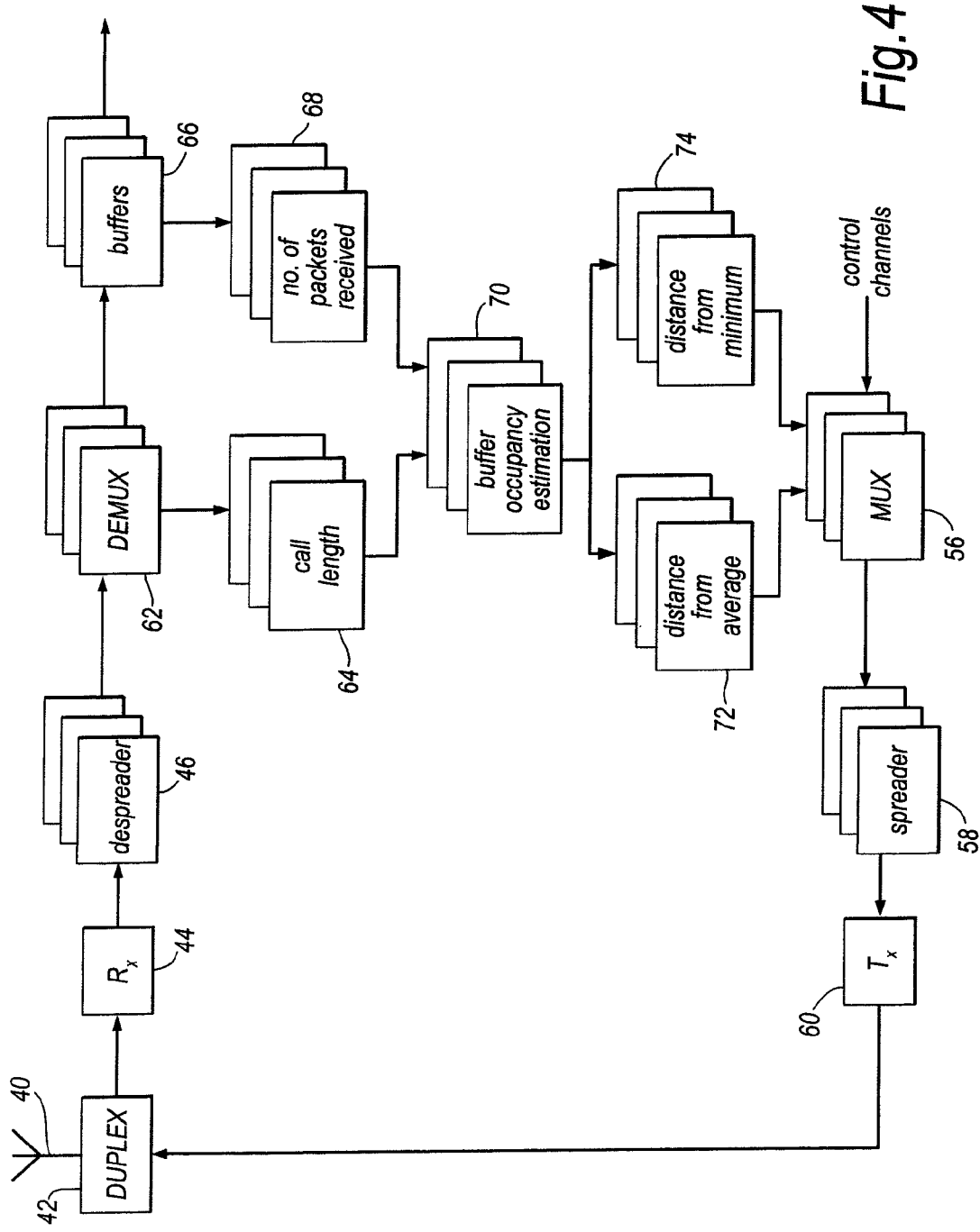
FIG. 4 shows parts of a base station in a second embodiment of the invention.

FIG. 4 shows parts of a base station in the second embodiment. Those parts which are the same as in the base station shown in FIG. 3 are given the same reference numerals and are not described further. Referring to FIG. 4, each of the demultiplexers 62 separates out the total number of packets value which is transmitted by one of the source UEs at the start of a packet call. These values are stored in call length indicators 64. The data packets for onward transmission to the destination UEs are output to buffers 66, one buffer being provided for each destination UE.

For each scheduling event, the number of packets received from each UE in the current packet call is output from the buffers 66 to number of packets received indicators 68. The total number of packets values from unit 64, and the number of packets received values from unit 68, are output to buffer occupancy estimation units 70. Each of these units estimates the buffer occupancy for one of the source UEs. This may be done, for example, by subtracting the number of packets received from the total number of packets for that UE. If desired, account could also be taken of the rate at which the UE buffer is expected to be filled.

The outputs of the buffer occupancy estimation units 70 are estimated buffer occupancy values for each of the source UEs. These values are fed to distance from average calculation units 72 and distance from minimum calculation units 74. These units calculate the distance from average and the distance from minimum values for each class, in a similar way to units 52 and 54 described above with reference to FIG. 3. The outputs of distance from average calculation units 72 and distance from minimum calculation units 74 are therefore estimated distance from average values and estimated distance from minimum values respectively for each source UE.

The thus calculated distance from average values and the distance from minimum values are fed to multiplexers 56 where they are multiplexed into a control channel that is to be transmitted to that UE. The various control channels are then transmitted to the source UEs in the same way as described above with reference to FIG. 3.

If desired, a combination of the first embodiment and the second embodiment could be used. For example, some source UEs could report their buffer occupancies at regular intervals using the first embodiment, while other source UEs could have their buffer occupancies estimated at the base station using the second embodiment. Each UE may switch from one technique to the other, for example, depending on channel conditions.

Examples

Figure 5:
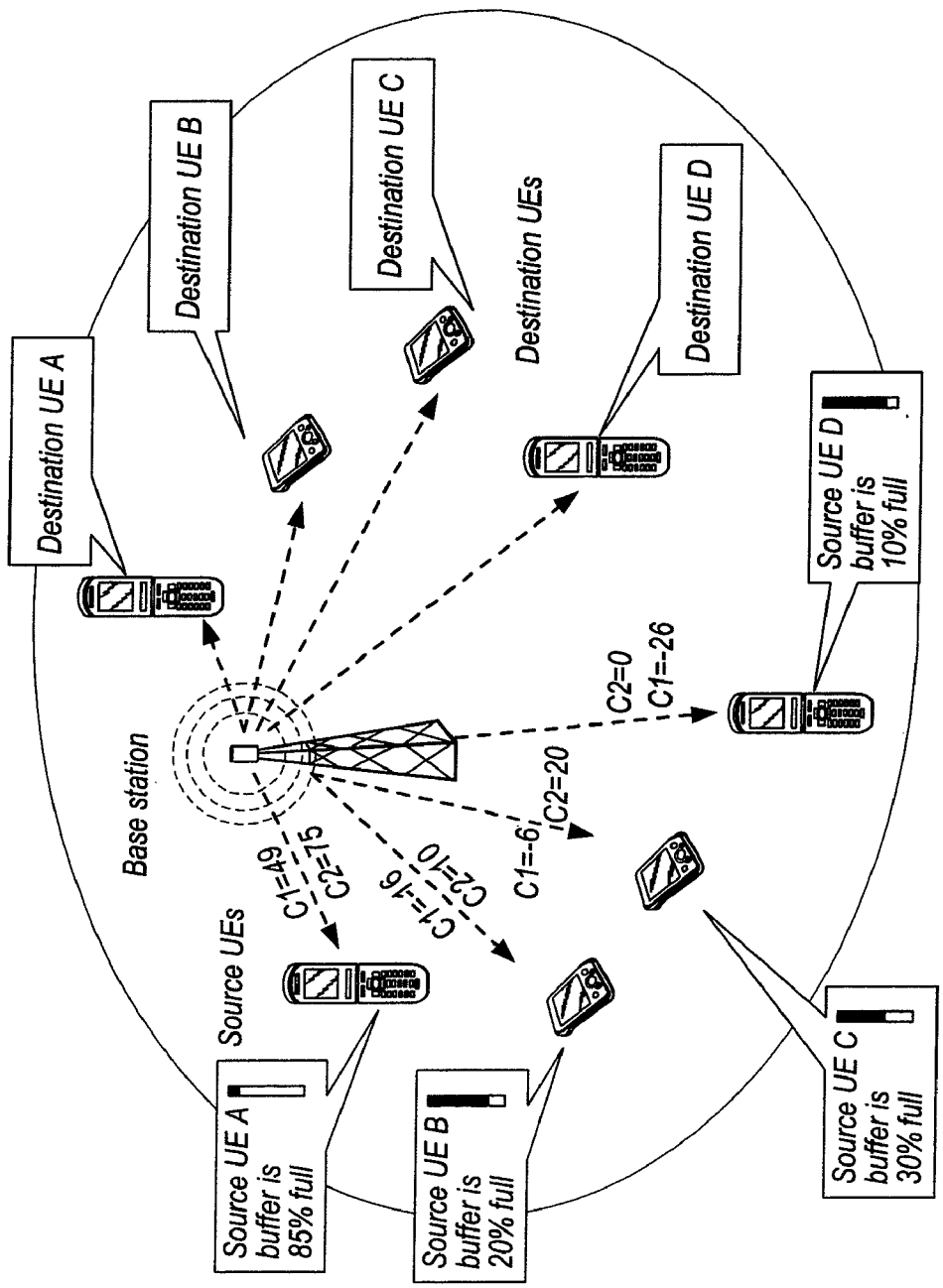
FIG. 5 shows an example of the operation of an embodiment of the invention.

An example of the operation of an embodiment of the invention will now be described with reference to FIG. 5. In FIG. 5 a situation is shown in which four source UEs A, B, C and D try to reach their corresponding destination UEs A, B, C and D through the base station. It is assumed that all the UEs experience similar radio channel conditions and SINR (signal to noise and interference ratio). They support streaming real-time service with similar delay tolerances. In FIG. 5, C1 is the distance from average value and C2 is the distance from minimum value. It can be seen that UE A has received C1=49 which means the amount of data in its buffer is well above the average amount of ratios of all UEs. It also receives a C2=75 meaning that it is far away from the UE with minimum buffer data. Looking at its buffer this source UE realizes that its packet data buffer is almost full and it needs to transmit faster to empty its buffer to come down to reach average data levels. Among other UEs, UE D has received the poorest distance from average and distance from minimum values. This UE will then have the slowest transmission rate because it assumes that is has already transmitted successfully enough and currently does not have much data for transmission. Therefore its buffer will start to grow to reach average level.

Thus embodiments of the present invention make each source UE aware of its situation compared to other source UEs in its cell or sector, in terms of packet data congestion and the amount of existing competition for radio channels. In making a decision about the transmission time (waiting time for other UEs) and transmission rate, the UE not only has an idea about its radio channel and how full its buffer is, but also it has an idea about the overall situation with other UEs. The UE is therefore able to make more efficient decisions. Significantly better QoS, better throughput and lower packet delivery delays are expected as a consequence.

The various embodiments which have been described above may be implemented using software modules running on a processor, for example a digital signal processor, or any other type of processor. The programming of such modules will be apparent to the skilled person from the description of the various functions. The skilled person will appreciate that such modules may be programmed on any appropriate processor using any appropriate programming language. Alternatively, some or all of the functions described above may be implemented using dedicated hardware.

It will be understood that the present invention has been described above purely by way of example, and modifications of detail can be made within the scope of the invention. For example, the instead of transmitting the distance from average values and the distance from minimum values for the base station to each user equipment, the base station may transmit signals indicating to each base station when and/or at what rate to transmit. The invention may be used with multiplexing techniques other than CDMA, such as time division multiple access (TDMA), frequency division multiplexing (FDM), hybrid TDMA/CDMA, or any other appropriate multiplexing technique.

The invention claimed is:

1. A mobile system for scheduling uplink data transmission from a plurality of mobile stations to a base station, the mobile system comprising:

the base station comprises a transmitting apparatus that transmits a respective indicator, which is used for deciding on a transmission data rate of uplink by adjusting modulation and coding scheme and controlling the transmission data rate, to each of said plurality of mobile stations, and the mobile station comprises a transmitting apparatus that transmits respective data amount information and data to the base station, wherein an amount of said data is decided by adjusting modulation and coding scheme and controlling the transmission data rate, based on the respective indicator which is transmitted to said mobile station.

2. A base station used in a mobile communication system in which data transmission is conducted from a plurality of mobile stations to said base station, said base station comprising:

a receiving apparatus that receives respective data amount information relating to a data amount from the plurality of mobile stations; and a transmitting apparatus that transmits a respective indicator, which is used for deciding on a transmission data rate of uplink by adjusting modulation and coding scheme and controlling the transmission data rate, to each of said plurality of mobile stations.

3. A method for scheduling uplink data transmission from a plurality of mobile stations to a base station, said method comprising:

outputting respective data amount information from said plurality of mobile stations to said base station;

outputting a respective indicator, which is used for deciding on a transmission data rate of uplink by adjusting modulation and coding scheme and controlling the transmission data rate, to each of said plurality of mobile stations from said base station; and outputting data from at least one of said plurality of mobile stations, wherein an amount of said data is decided by adjusting modulation and coding scheme and the controlling the transmission data rate based on the respective indicator which is transmitted to said mobile station.

* * * * *

UNITED STATES PATENT AND TRADEMARK OFFICE
CERTIFICATE OF CORRECTION

PATENT NO. : 8,054,794 B2  
APPLICATION NO. : 12/646031  
DATED : November 8, 2011  
INVENTOR(S) : Saied Abedi Page 1 of 1

It is certified that error appears in the above-identified patent and that said Letters Patent is hereby corrected as shown below:

Title Page, item (62) should read as follows:

Related U.S. Application Data

-- (62) Division of application No. 10/565,866, filed on Jan. 24, 2006, now Pat. No. 7,660,280, which is a 371 of PCT/GB2004/004209, filed on Oct. 1, 2004. --

Title Page, item (30) should read as follows:

-- (30) Foreign Application Priority Data

Oct. 3, 2003 (GB)....................0323246.9 --

Signed and Sealed this  
Second Day of October, 2012

David J. Kappos  
*Director of the United States Patent and Trademark Office*